United States Patent [19]
Downs et al.

[11] Patent Number: 5,309,850
[45] Date of Patent: May 10, 1994

[54] INCINERATION OF HAZARDOUS WASTES USING CLOSED CYCLE COMBUSTION ASH VITRIFICATION

[75] Inventors: William Downs; Stanley J. Vecci; James J. Warchol; Steve C. Datsko, all of Alliance; George H. Hay, Eindlay, all of Ohio

[73] Assignee: The Babcock & Wilcox Company, New Orleans, La.

[21] Appl. No.: 977,931

[22] Filed: Nov. 18, 1992

[51] Int. Cl.[5] ............................................. F23J 11/00
[52] U.S. Cl. ..................................... 110/235; 110/345; 110/204
[58] Field of Search ..................... 110/235, 204–210, 110/211, 215, 216, 233, 344, 345, 346, 165 A

[56] References Cited

U.S. PATENT DOCUMENTS

| | | | |
|---|---|---|---|
| 2,102,427 | 12/1937 | Lloyd et al. | 110/346 |
| 3,779,212 | 12/1973 | Wagner | 122/23 |
| 3,861,334 | 1/1975 | Stockman | 110/10 |
| 4,579,069 | 4/1986 | Gay et al. | 110/342 |
| 4,656,972 | 4/1987 | Shimoda | 122/40 |
| 4,782,772 | 11/1988 | Chughtai | 110/345 |
| 4,827,854 | 5/1989 | Collette | 110/237 |
| 4,860,670 | 8/1989 | Jorgensen | 110/215 |
| 4,915,039 | 4/1990 | Ringe | 110/346 |
| 5,179,903 | 1/1993 | Abboud et al. | 110/345 |

FOREIGN PATENT DOCUMENTS 49114  3/1987  Japan ...................... 110/346

Primary Examiner—Henry A. Bennet
Assistant Examiner—William C. Doerrler
Attorney, Agent, or Firm—Daniel S. Kalka; Robert J. Edwards

[57] ABSTRACT

A closed combustion system is used to incinerate hazardous wastes and vitrify ash. An incinerator is provided with pure oxygen, hazardous waste and fuel for incinerating the hazardous waste. Slag from the incinerator is treated separately. Combusted products from the incinerator such as flue gases, liquids, solids and ash are channeled through the system and recirculated back to the incinerator for incineration. A dust collector is used to collect ash from the combusted product and recirculate back to the incinerator. A condensing heat exchanger is used to collect and dispose of waste liquids. Filters are used for filtering particulates from the combusted product. A CaO pebble bed is provided for causing reactions with the flue gases. Remaining insert gas in the system are bled into the atmosphere. Flue gases from the system are recirculated back into the pure oxygen for entry into the incinerator in order to provide temperature control.

16 Claims, 4 Drawing Sheets

INCINERATION OF HAZARDOUS WASTES USING CLOSED CYCLE COMBUSTION ASH VITRIFICATION

BACKGROUND OF THE INVENTION

1. Field of the Invention

The present invention relates in general to the incineration of hazardous wastes and, in particular, to the incineration of hazardous wastes using closed cycle combustion and ash vitrification.

2. Description of the Related Art

Incineration is the principal means employed for the permanent destruction of hazardous organic wastes. The incinerator destruction efficiency of some organic hazardous wastes must be on the order of 99.9%. Other organics must be destroyed to an efficiency of 99.99%, and still others such as dioxins must be destroyed to an efficiency of 99.9999%. Under some conditions, hazardous wastes can be burned in conventional boilers. However, these boilers are not always well suited to achieve the high destruction efficiencies required. For example, the carbon conversion efficiency of a coal-fired boiler usually will not exceed much more than about 99.6%. Conventional incinerators designed for the explicit purpose of destruction of hazardous organic wastes include simple refractory enclosures designed to burn liquid wastes (liquid injection furnaces), rotary kilns, multiple rotary hearths, and fluidized bed incinerators.

All known hazardous waste incineration processes are open cycle processes with respect to the gas phase. Air is used as the oxidant and consequently, flue gas, i.e., the products of the reaction plus nitrogen, must be exhausted from the process and vented to the atmosphere. One consequence of this situation is the fact that if the destruction of the hazardous waste is not completed to the prescribed extent, e.g., 99.99%, then the untreated hazardous waste is released directly to the atmosphere where it can endanger public health. This situation is complicated further by the fact that no economically viable continuous monitoring instrumentation exists which can measure the emission rate of these hazardous species on a full time basis. Adequate performance of the incinerator must be "inferred" based upon periodic spot tests of the incinerator. These spot tests are used to define a proper set of operating conditions for that incinerator to "insure" the destruction of the specific hazardous wastes.

SUMMARY OF THE INVENTION

The present invention is a new and useful system for the incineration of hazardous wastes using closed cycle combustion and ash vitrification.

Through closed cycle combustion, the discharge of large volumes of flue gases could be reduced or eliminated. In closed cycle combustion, pure oxygen is used in place of air as the oxidant. No nitrogen is added during combustion. The products of combustion will include, principally, carbon dioxide ($CO_2$) and water vapor. If the hazardous waste contains chlorinated hydrocarbons, HCl also becomes a major reaction product. Trace gaseous constituents could also include $SO_2$, CO, and nitrogen. The primary source of nitrogen would probably be air infiltration into the incinerator components through such places as shaft seals.

The present invention is a closed combustion cycle which minimizes gaseous emissions.

The present invention comprises a primary combustion device such as a dry rotary kiln, a slagging rotary kiln, a rotary hearth, a fluidized bed, a cyclone furnace, or even a conventional refractory incinerator, i.e., a liquid injection incinerator. The combustion device is fired with the hazardous waste, auxiliary fuel, and a pure oxygen stream. Extremely high combustion temperatures can be achieved because no nitrogen is present to attemperate the combustion products. To control the flame temperature, combustion products are recirculated back to the primary furnace via a recirculation stream. Because much higher flame temperatures are achievable than in conventional combustion, no auxiliary or afterburner is required. However, an afterburner can be included as a contingency to insure proper mixing and residence time. If a slagging combustor is used, then the inorganic materials exit the process as a molten slag in a slag stream. These slags will become vitrified as they cool and, thus, rendered harmless.

The combustion products leaving the combustor and afterburner will consist of carbon dioxide; water vapor; oxygen; and trace amounts of HCl, $SO_2$, $N_2$ and possibly other miscellaneous gaseous products of combustion. The total molar flow rate of these gases in the streams will be 30% to 60% less than conventional incinerators. Since higher combustion temperatures are achievable and since the reaction kinetics for the oxidation of these hazardous wastes increase exponentially with temperature, the incinerator size becomes substantially smaller at the same hazardous waste feed rate.

The gas temperature leaving the incinerator may be in excess of 2200° C. In order to cool these gases, a waste heat boiler can be used. No direct evaporative cooling such as with a water spray is appropriate because the present invention seeks to minimize the quantity of water in the flue gas. That water which is generated as a result of the combustion process is extracted in a condensing heat exchanger. The condensing heat exchanger may be placed after a pebble bed lime reactor. However, it is preferred to place the condensing heat exchanger after a dust collector and before the pebble bed lime reactor.

A large fraction, i.e., as much as ⅔ of the flue gases leaving the waste heat boiler is diverted back to the incinerator through a recirculation fan by way of a stream. That stream is used to dilute the incoming oxygen stream with carbon dioxide and water vapor to control the peak flame temperature to the allowable limits of the incinerator materials. By diverting the recirculated flue gas before the dust collector, the quantity of flue gas treated by the dust collector is reduced. In some applications, however, where the fly ash quantity is high and ash recycle is to be employed in order to vitrify the ash in the incinerator, it may be preferred to divert the recycle gas to the incinerator after it has passed through the dust collector. In this way, the recycled ash can be pretreated before reinjection into the incinerator.

After leaving the dust collector, the flue gases will pass to a condensing heat exchanger via another stream. The purpose of the condensing heat exchanger is to remove the waters of combustion from the flue gases. The flue gases will be at a temperature at or below the water vapor dew point, i.e., typically less than 50° C. The condensed water will have a high potential for contamination and will, therefore, require treatment as a waste water.

Before entering the lime pebble bed reactor, the flue gases will pass through a final "absolute" filter such as a HEPA filter. The purpose of this filter is to insure that the pebble bed does not become contaminated with any hazardous substance which might, in turn, cause the lime bed to be considered to be hazardous. The pebble bed itself consists of lime of a size distribution roughly $\frac{1}{2}'' \times 0''$. The pebble lime is principally calcium oxide, CaO. The reactions which take place in the pebble bed are:

$$CO_2 + CaO \rightarrow CaCO_3$$

$$H_2O + CaO \rightarrow Ca(OH)_2$$

$$2HCl + CaO \rightarrow CaCl_2 + H_2O$$

$$SO_2 + CaO \rightarrow CaSO_3 \cdot \tfrac{1}{2} H_2O$$

Of these four reactions, the first is by far the slowest. The pebble bed is, therefore, sized to achieve at least 80% $CO_2$ reaction and removal. The only gases remaining after the pebble bed are the oxygen, about 20% of the $CO_2$, and traces of inert gases, principally $N_2$. Most of these gases are returned to the incinerator. A small bleed stream is provided through an inert vent, in order to purge the inert gases from the system. The size of this inert vent depends primarily upon the amount of incidental air infiltration into the system.

Although the lime pebble bed reactor is the preferred apparatus and method for this process, persons skilled in the art will recognize that other methods of CO2 removal could be substituted. These include for example, chemical absorption with organic amines such as MEA, DEA, diglycolamine, diisopropanolamine, hot potassium carbonate, N-Formyl morpholine, and a slurry of highly reactive iron. Physical absorption methods include methanol, propylene carbonate, polyglycol dimethyl ether, Solfolane, and Purisol. Physical adsorption processes which can remove CO2 include hydrated iron oxide coated wood chips and activated carbon.

Since the inert gas stream is of such a low flow rate, it is advantageous to use large "absolute" filters for filtration of any trace particulate which may still be entrained in the gas. Two absolute filters in series can be employed to insure that no particulate emissions are vented. When these filters are periodically replaced, the old filters can be incinerated.

For a given heat input, the incinerator size is smaller than a conventional incinerator. This reduces cost and also improves incineration because the mixing of reactants is easier to achieve in a smaller combustion chamber. The allowable combustion temperature is limited only by the constraints of the construction materials used on the incinerator to contain the combustion. Higher temperatures aid the oxidation of organic compounds exponentially.

Higher temperature operation results in more vaporization of heavy metals. These heavy metal are removed in the dust collector, the condensing heat exchanger, and the absolute filter following the heat exchanger. Most of the heavy metals are caught by the dust collector. When ash recirculation is employed, heavy metals continue to build up because the more volatile metals will continue to partition towards the gas phase in the incinerator. Thus, eventually, the heavy metal content of the fly ash raises to an extent where either recovery is economical or disposal is selected. If disposal is selected, the advantage gained by ash recycle is that the volume of waste is greatly diminished over that which would have been discarded without ash recycle.

The depleted pebble bed consists simply of solid calcium salts such as limestone, gypsum, calcium chloride, calcium hydroxide, and unreacted CaO. All of these materials are easily landfilled in sanitary landfills without treatment. The pH of this mixture is about 12.4. The allowable limit is 12.5.

It is an object of the present invention to eliminate large volumes of hazardous waste through closed cycle combustion using pure oxygen.

Another object of the present invention is to provide closed cycled combustion incineration that minimized the release of non-containable emissions.

It is also an object of the present invention to have a 20 to 100 fold reduction in gaseous emissions from the incinerator.

Another object of the present invention is to achieve destruction and removal efficiency (DRE) of hazardous organic wastes in a fashion superior to conventional incineration because higher temperatures and longer residence times are achievable in equipment of equivalent size.

Another object of the present invention is to provide for heavy metals to be removed in a vitreous ash or concentrated in the flyash to the point of economic recovery.

Still another object of the present invention is to ensure that non-volatile radionuclides will easily and effectively report to the slag.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
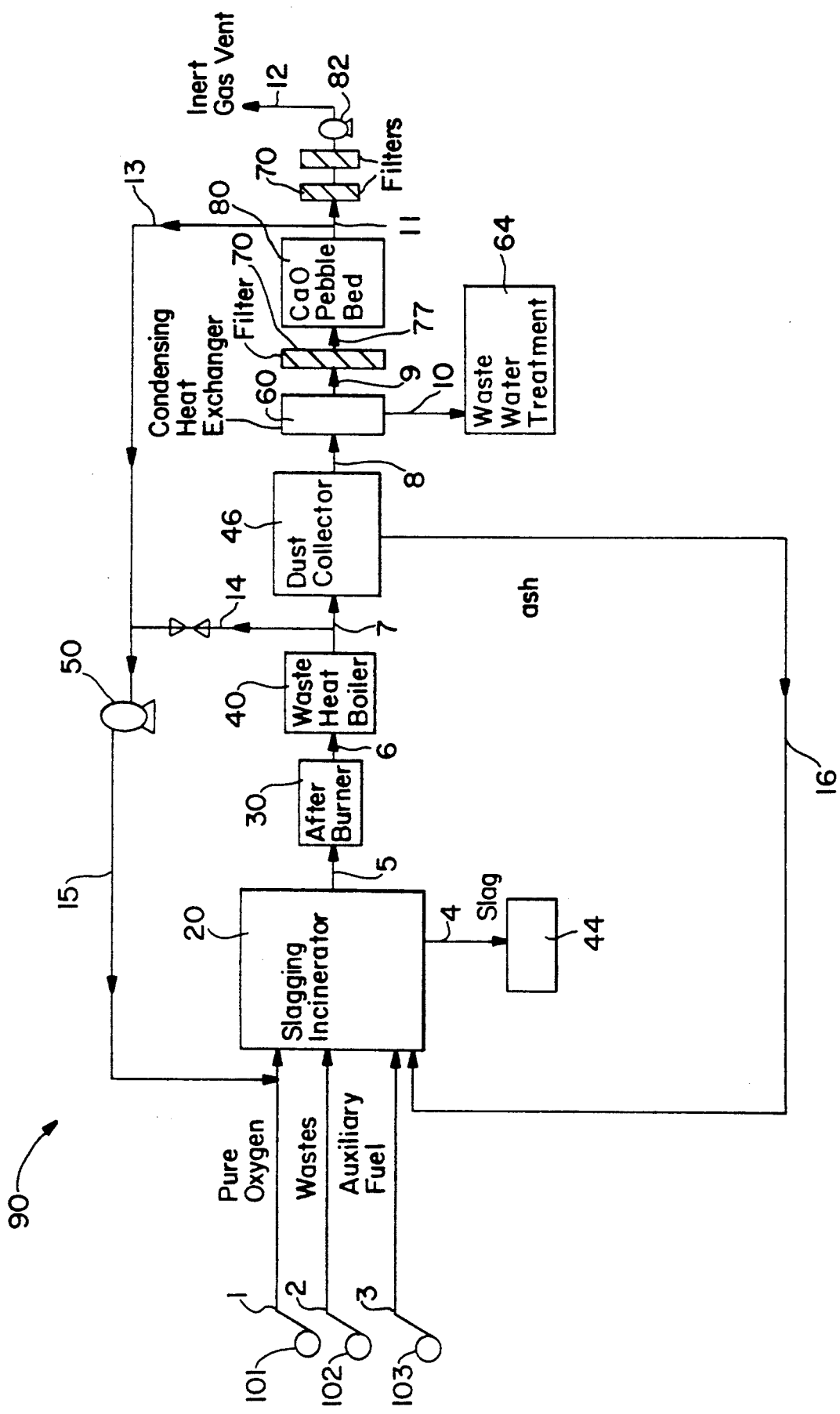
FIG. 1 is a schematic diagram of a closed combustion cycle of the present invention.

Referring to the drawings in particular, the invention embodied in FIG. 1 comprises a closed combustion cycle generally designated 90 for the incineration of hazardous wastes. A combustion device 20 such as a slagging incinerator receives a pure oxygen stream 1 originating from a pure oxygen source 101. The combustion device 20 also receives a waste stream 2 originating from a waste source 102. An auxiliary fuel stream 3 originating from an auxiliary fuel source 103 is also provided to the combustion device 20.

Combustion products such as flue gases leave the combustion device 20 through a combustion exit stream 5 which is sent to an afterburner 30 for proper mixing and residence time of the combustion products. The afterburner 30 is optional due to the high flame temperatures achieved by the present invention and can be used as a contingency for ensuring that high temperatures are achieved.

A slag collection source or slagging combustor 44 can receive slag in the form of a slag stream 4 from a combustion device 20 if required.

The combustion products are then sent to a waste heat boiler 40 by an after burner exit stream 6. The waste heat boiler 40 ensures that the gases leaving the afterburner are cooled due to excessive high temperatures.

A boiler exit stream 7 is then channelled to a dust collector 46. The combustion products such as flue gases contained in the boiler exit stream 7 are channelled in a first recirculated stream 14 taken from the boiler exit stream 7. These flue gases from the first recirculated stream 14 are channeled by a recirculation fan 50 for recirculation back into the combustion device 20.

The dust collector 46 ensures that ash is taken from the gases for eventual recycle into the combustion device 20. The ash exits the dust collector 46 through an ash exit stream 16 which is provided directly to the combustion device 20.

The gases are then passed from the dust collector 46 through a dust collector exit stream 8 to a condensing heat exchanger 60. The condensing heat exchanger 60 removes waters of combustion from the flue gases. The removal of water from the condensing heat exchanger 60, is provided by a waste water stream 10 being channelled to a waste water treatment source 64.

Remaining gases exit the condensing heat exchanger 60 through an exchanger exit stream 9 into an absolute filter 70. The absolute filter 70 ensures that any hazardous substances remaining in the flue gas are filtered out before entering a pebble bed 80 consisting of lime, principally calcium oxide, CaO. The filtered gas enters the pebble bed 80 by the filter exit stream 77. After reacting with the CaO within the pebble bed 80 the remaining gases are passed to additional absolute filters 70 through a bed exit stream 11 originating from the pebble bed 80.

The remaining gases found in the bed exit stream 11 are taken by a second recirculated stream 13 to the recirculation fan 50 for recirculation back into the combustion device 20.

The recirculation fan 50 takes recycled gases from both the first recirculating stream 14 and the second recirculated stream 13 and channels them into a final recirculated stream 15 which is in turn, provided to the pure oxygen 1 for entry back into the combustion device 20. The final recirculated stream 15 is channelled into the pure oxygen stream 1 for flame temperature control purposes.

Any remaining gases taken from the absolute filter 70 provided after the bed exit stream 11 are bled into the atmosphere through an inert vent 82 and a subsequent bleed stream 12.

Figure 2:
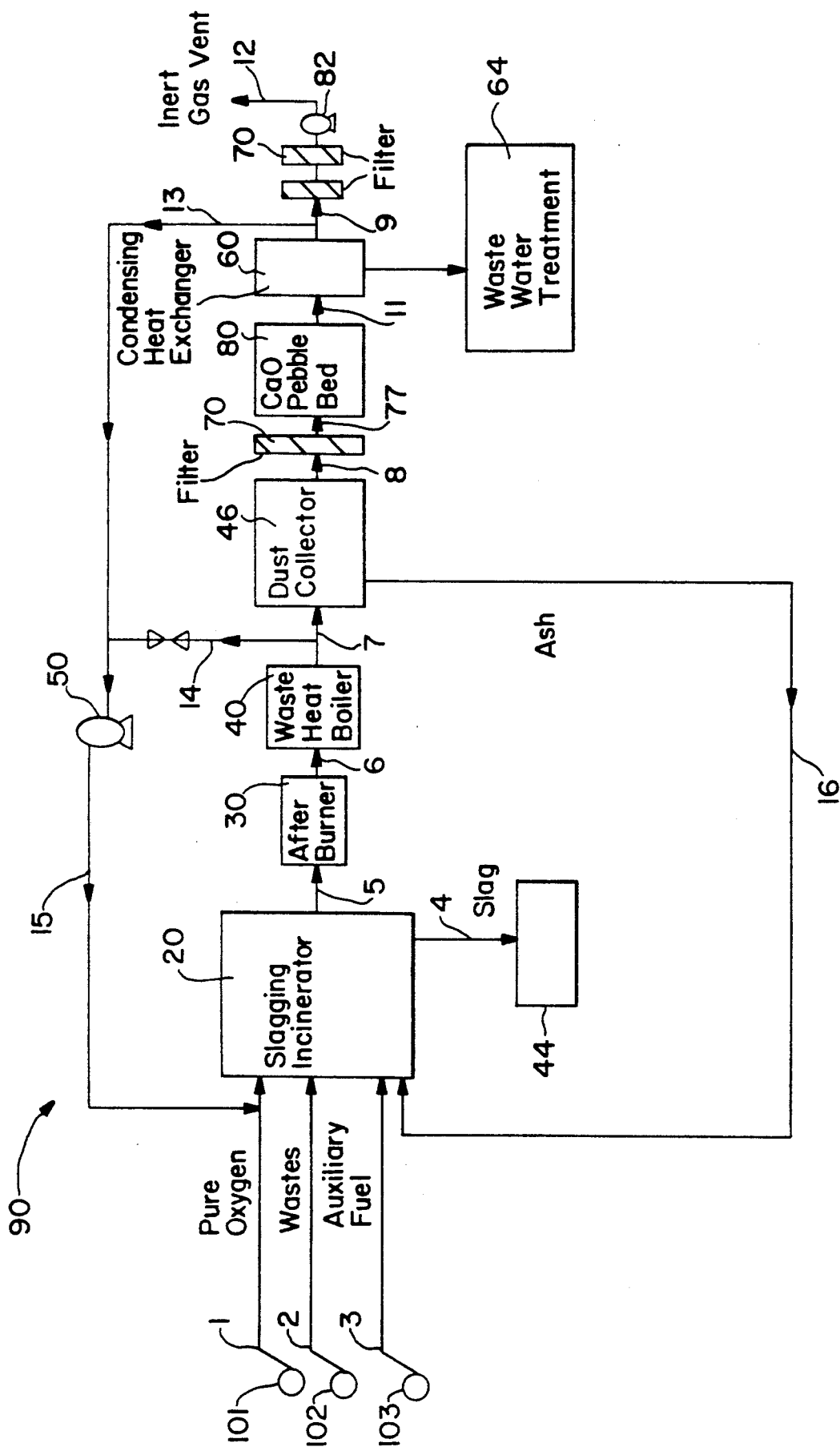
FIG. 2 is a schematic diagram of a second embodiment of the present invention.

FIG. 2 is another embodiment of the present invention where the pebble bed 80, is positioned before the condensing heat exchanger 60. This arrangement will permit operation of the pebble bed 80 at temperatures as high as about 800° F. The reaction rate between $CO_2$ and CaO is temperature dependent. As the temperature rises, the reaction rate increases.

Figure 3:
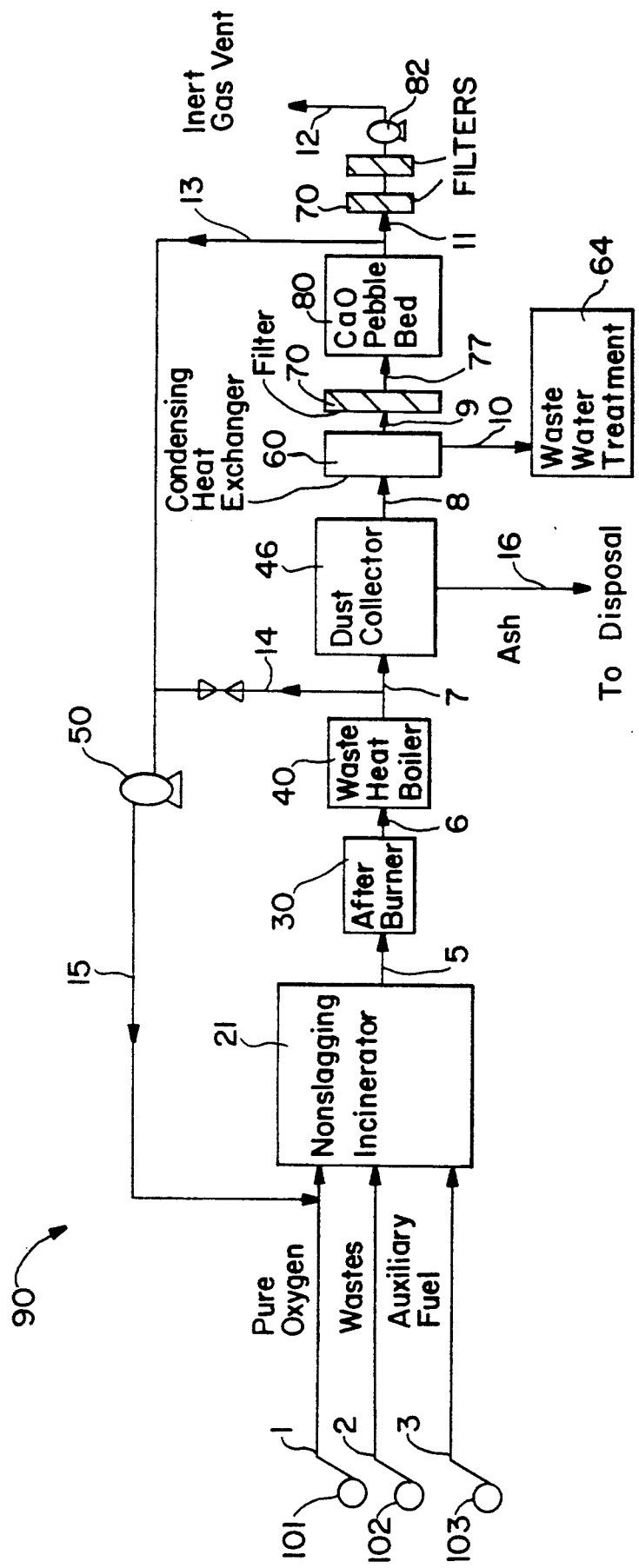
FIG. 3 is a schematic diagram of a third embodiment of the present invention.

Finally, FIG. 3 is a third embodiment of the present invention where the inorganic content of the hazardous waste is either of a very low concentration or is deemed to be inert. A non-slagging combustor 21 is provided for incineration, the ash that is present in the flue gas is disposed of after being collected in a high efficiency dust collector 46 such as a bag house.

This process offers both technical advantages and benefits to the public. The technical advantages arise from two process features. The first is oxygen-substituted combustion and the second is closed cycle operation. There are several benefits derived from oxygen-substituted combustion.

First, volume flow rate of flue gases generated in the combustor is substantially less than in conventional air-supported combustion. Therefore, for a combustor of equal size, the residence time at a given temperature is substantially higher. In the extreme, the residence time can be increased by a factor of about 5.

Figure 4:
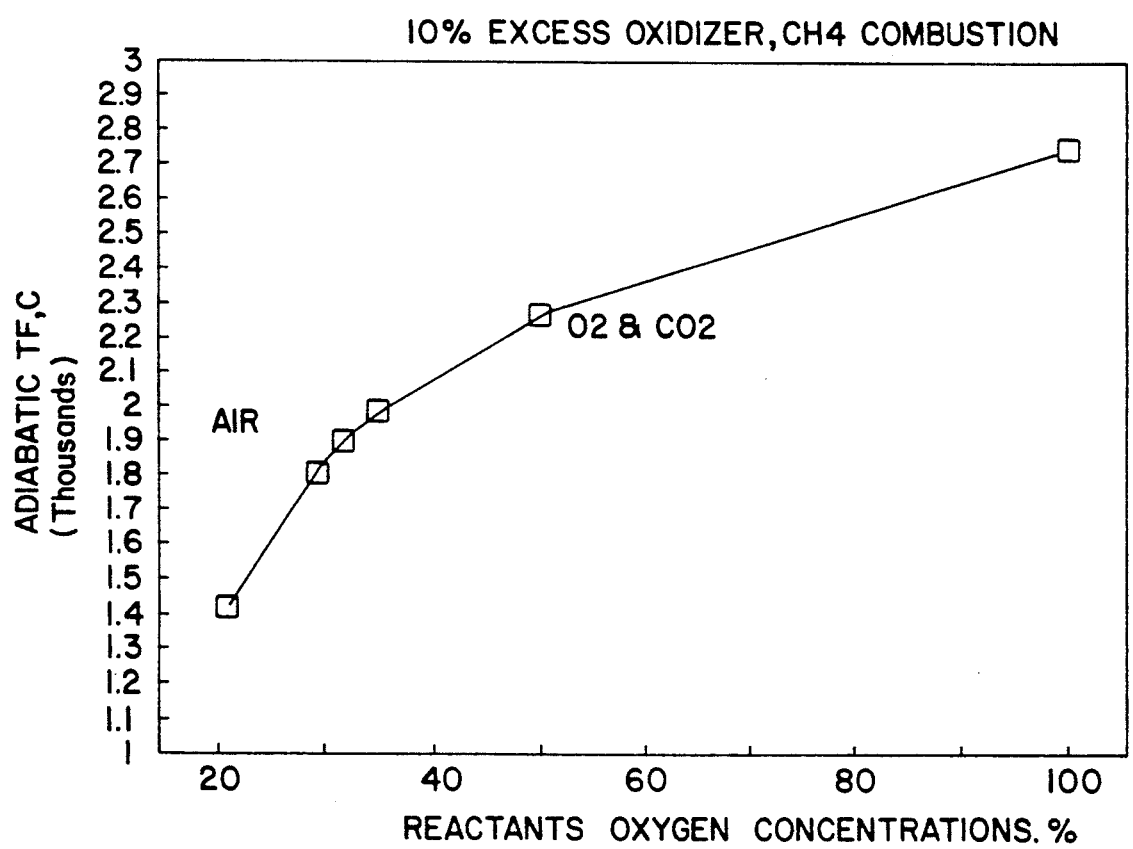
FIG. 4 is a graph plotting adiabatic flame temperatures versus oxygen concentration in a $CO_2/O_2$ gas mixture of the present invention.

Second, the operator has independent control over the gas temperature in the combustor. He can achieve that control by simply varying the quantity of recirculated flue gas returned to the combustor. A plot of adiabatic flame temperatures versus oxygen concentration in a $CO_2/O_2$ gas mixture is shown in FIG. 4. Thus, if the operator needs to increase the flame temperature in the combustor to deal with a particularly difficult waste, he simply reduces the amount of recycled gas to the combustor. The action will not only increase the combustor temperature, but also increase the residence time.

Third, the technical advantage arising from oxygen-substituted combustion is that very little nitrogen will be present. Therefore, although this process will have the capability to operate at very high flame temperatures, $NO_x$ formation will be limited by the absence (or low concentration) of nitrogen. Even if some fugitive nitrogen is present in the flue gas and if it were to oxidize in the flame zone, reaction and removal in the pebble bed should be nearly quantitative. This expectation arises out of the fact that nitrous and nitric acids are both stronger acids than carbonic acid.

Fourth, although this process is applicable to any combustor type design, it offers an additional benefit for slagging combustors such as a cyclone furnace or any slagging rotary kiln. That advantage has to do with the ability of the operator to deal with variations in the slagging properties of different contaminated soils, sludge, and sediments. If the slagging properties change during operation, the operator can simply change the combustor operating temperature by controlling the flue gas recirculation rate.

Fifth, for field transportable incinerator systems, equipment sizes are limited by DOT regulations. Since oxygen-substituted combustion required smaller equipment for equivalent heat input, it follows that this process will permit larger thermal capacity to be built into field transportable systems.

Additionally, there are several technical advantages arising from closed cycle operation. Since continuous monitoring of flue gas streams for contaminants in concentration which may be hazardous is considered to be technically impractical and beyond the state of the art, then any process which eliminates that effluent stream, in effect, avoids that problem.

Of all the potential emissions for a hazardous waste incinerator, i.e., gas, solid, and liquid, the only ones which are not "containable" are the gaseous emissions. Closed cycle operation, thus, minimizes the release of non-containable emissions.

Some gases which are inert or unreactive, such as nitrogen and argon, are likely to accumulate in this closed cycle process. Therefore, a vent for these inert gases must be provided. Since this purge stream will be of such small magnitude, it will be practical to filter or even double filter this stream with HEPA filters before exhausting these gases to the atmosphere. It is estimated that the volume flow rate of this stream will be about 1 to 5% of that which would be exhausted by an air-supported combustion/incineration process.

The benefits of this process for the control of heavy metals depends upon the details of the combustor. For a slagging combustor such as a cyclone furnace, that portion of the heavy metals which do not leave the process with the slag will find their way to the following locations:

1. A bag filter dust collector where essentially all of the soil and ash which carries over from the cyclone is collected. Soil remediation tests performed on a pilot cyclone furnace have shown that less than 5% of the soil fed to the cyclone is carried over to the dust collector. Thus, the heavy metals which remain with the "flyash" may be concentrated by a factor of nearly 20. This ash stream could be disposed of as a hazardous waste. A preferred approach, however, would be to pelletize this ash and reinject it into the cyclone. In this way, more of the heavy metals will be driven to the slag. The more volatile heavy metals will continue to be carried over to the dust collector in ever increasing concentration with each ash recycle. Eventually, this contaminated flyash may require disposal. However, this preferred approach would be to continue to concentrate the heavy metals in the flyash stream until heavy metal recovery would become economically warranted in lieu of disposal as a hazardous waste. Even if disposal as a hazardous waste is the only viable option, this ash recycle process will represent a means of greatly concentrating, and thereby will reduce by orders of magnitude, the volume of waste which must be disposed.

2. Heavy metals which might escape the dust collector either as particulate or because they still exist as vapors may be collected by the condensing heat exchanger. If so, these heavy metals may find their way to the condensate. If that were to happen, then the condensate must undergo treatment. The usual procedure is to precipitate the heavy metals in waste water by adjusting the pH with lime. Since this process will have a ready supply of lime, it will be a relatively simple matter to precipitate these heavy metals and send the sludge back to the incinerator. This procedure will insure that the heavy metals will eventually leave the process in only one of two streams, i.e., the slag or the flyash.

3. Since the gases leaving the condensing heat exchanger are likely to be below the water vapor dew point, it is unlikely that any heavy metals will still exist as vapors (a possible exception is mercury). Before entering the lime pebble bed, these gases will pass through a filter whose function is to prevent contamination of the lime bed with heavy metals which might compromise the bed for final disposal as non-hazardous waste. If this filter were to become laden with heavy metal contaminants, it would be replaced with a clean filter. The dirty filter would then be returned to the incinerator for disposal.

4. If all of these systems failed to remove heavy metals sufficiently to protect the pebble lime reactor bed, then it is conceivable that the bed could become contaminated with these heavy metals. Trace quantities of heavy metals which would become fixated by the lime may or may not be considered sufficient to compromise the bed material for disposal as a non-hazardous waste. The probability that all of these systems placed ahead of the bed would fail to protect the bed is remote. For example, if lead were to accumulate in the lime bed to a concentration of 100 mg/kg of lime, and if all of that were leachable by TCLP, then the lime bed would be considered to be compromised. However, in order for that eventuality to occur, for a waste containing 14,000 ppm of lead, the bag filter, condensing heat exchanger, and the bed prefilter would have to have a combined efficiency for lead capture of less than 90%, conservatively, assuming that none of the lead goes with the slag.

5. The final depository for heavy metals in this process would be the two filters which protect the inert gas vent. These filters (which can be HEPA filters) are present to provide a final level of assurance that no hazardous particular materials escape with the inert gases. The most probable source of particulate at that point would be fines from the pebble bed. Like all filters, these filters will require periodic replacement. As with the other filters in the system, these filters can be sent to the combustor/incinerator for disposal.

While the specific embodiments of the invention have been shown and described in detail to illustrate the application of the principles of the invention, it will be understood that the invention may be embodied otherwise without departing from such principles.

What is claimed is:

1. A closed system for incinerating hazardous wastes, the system comprising:

a combustion incinerator for combusting the hazardous wastes into a combusted product comprising gases, liquids, solids, slag and ash;

an oxygen source connected to the incinerator for providing substantially pure oxygen to the incinerator;

a waste source connected to the incinerator for supplying waste to the incinerator for combustion;

a fuel source connected to the incinerator for supplying fuel to the incinerator;

first gas recycling means for recirculating combusted product by channeling combusted product back into the incinerator, said first gas recycling means positioned after the incinerator;

a dust collector positioned after the incinerator for collecting ash from the combusted product received from the incinerator;

means for recycling ash from the dust collector back into the incinerator;

a condensing heat exchanger positioned after the dust collector for receiving combusted product from the dust collector and removing liquids from the combusted product;

means for treating liquids collected by the condensing heat exchanger;

a filter positioned after the heat exchanger for filtering the combusted product;

means for removing $CO_2$ from the combusted product;

second gas recycling means for recirculating combusted product by channelling combusted product back into the incinerator, said second gas recycling means positioned after the $CO_2$ removing means; and means for bleeding inert gases from the system.

2. The system according to claim 1, wherein the first and second gas recycling means for recirculating combusted product channels the combusted product into the pure oxygen source for entry into the incinerator.

3. The system according to claim 1, wherein said means for removing $CO_2$ includes a pebble bed comprised principally of calcium oxide (CaO) positioned after the filter for reacting with the combusted product.

4. The system according to claim 3, wherein a plurality of filters are positioned after the pebble bed for filtering the combusted product, after the combusted product reacts with the calcium oxide, CaO, of the pebble bed, and positioned upstream of the means for bleeding inert gases.

5. The system according to claim 3, wherein the filter and pebble bed respectively are positioned between the dust collector and the heat exchanger.

6. The system according to claim 1, wherein an afterburner is positioned after the incinerator for additional burning of the combusted product received from the incinerator.

7. The system according to claim 1, wherein a boiler is positioned after the afterburner for cooling the combusted product exiting the afterburner.

8. A method for incinerating hazardous wastes in a closed system, the method comprising the steps of:
supplying hazardous waste to an incinerator for combusting the waste into a combusted product comprising gases, liquids, solids, slag and ash;
supplying pure oxygen to the incinerator for combusting the waste;
supplying fuel to the incinerator for combusting the waste;
recirculating some of the combusted product back into the combustor for further combustion;
channeling the combusted product to a dust collector for collecting ash from the combusted product;
recycling the collected ash from the dust collector back into the incinerator;
channeling the combusted product to a condensing heat exchanger for removing liquids from the combusted product;
treating the liquids collected by the condensing heat exchanger;
filtering the combusted product channeled through the condensing heat exchanger;
channeling the combusted product to a calcium oxide (CaO) pebble bed for reacting with the combusted product;
recirculating some of the combusted product back into the incinerator for further combustion; and
bleeding inert gases from the system.

9. The system according to claim 1, wherein the incinerator is a slagging incinerator.

10. The system according to claim 1, wherein the incinerator is a non-slagging incinerator.

11. The method according to claim 8, further comprising the steps of replacing the filter and burning it in the incinerator.

12. The method according to claim 8, wherein the combusted product is recirculated back into the incinerator together with the pure oxygen.

13. The method according to claim 8, wherein the combusted product is filtered after being channeled through the calcium oxide (CaO) pebble bed.

14. The method according to claim 8, wherein the combusted product is filtered and channeled through the calcium oxide (CaO) pebble bed after exiting the dust collector.

15. The method according to claim 8, wherein the combusted product is burned in an afterburner after leaving the incinerator.

16. The method according to claim 8, wherein the combusted product is cooled in a boiler after burning in the afterburner.

* * * * *